United States Patent [19]

Cole, Jr. et al.

[11] 4,128,497

[45] Dec. 5, 1978

[54] DICHROIC LIQUID CRYSTAL COMPOSITIONS

[75] Inventors: Herbert S. Cole, Jr., Scotia; Siegfried Aftergut, Schenectady, both of N.Y.

[73] Assignee: General Electric Company, Schenectady, N.Y.

[21] Appl. No.: 802,358

[22] Filed: Jun. 2, 1977

Related U.S. Application Data

[63] Continuation-in-part of Ser. No. 721,668, Sep. 9, 1976, abandoned.

[51] Int. Cl.$^2$ ............................ C09K 3/34; G02F 1/13
[52] U.S. Cl. ...................................... 252/299; 252/408; 350/349; 350/350; 260/144; 260/154; 260/156; 260/169; 260/184; 260/186
[58] Field of Search ................................ 252/299, 408; 350/160 LC, 349, 350

[56] References Cited

U.S. PATENT DOCUMENTS

| | | | |
|---|---|---|---|
| 3,597,044 | 8/1971 | Castellano | 252/299 |
| 3,833,287 | 9/1974 | Taylor et al. | 252/408 |
| 3,864,022 | 2/1975 | Moriyama et al. | 252/299 |
| 3,876,286 | 4/1975 | Deutscher et al. | 252/299 |
| 3,915,883 | 10/1975 | Van Meter et al. | 252/299 |
| 3,953,491 | 4/1976 | Steinstrasser et al. | 252/299 |
| 3,960,750 | 6/1976 | Moriyama et al. | 252/299 |
| 3,960,751 | 6/1976 | Moriyama et al. | 252/299 |
| 4,002,670 | 1/1977 | Steinstrasser | 252/299 |
| 4,032,470 | 6/1977 | Bloom et al. | 252/299 |

FOREIGN PATENT DOCUMENTS

| | | | |
|---|---|---|---|
| 2627215 | 1/1977 | Fed. Rep. of Germany | 252/299 |
| 2631428 | 1/1978 | Fed. Rep. of Germany | 252/299 |
| 1459046 | 12/1976 | United Kingdom | 252/299 |

OTHER PUBLICATIONS

Constant, J. et al., "Pleochroic Dyes with High Order Parameters," presented at 6th Intnat'l L. C. Conf., Kent, Ohio (Aug. 23-27 1976).

Blinov, L., et al., J. Phys. (Paris), vol. 36, Cl., No. 3, pp. 69-76 (1975).

White, D., et al., J. Appl. Phys., vol. 45, No. 11, pp. 4718-4723 (1974).

Bloom, A., et al., Mol. Cryst. Liq. Cryst., vol. 41, pp. 1-4 (8/18/77).

*Primary Examiner*—Benjamin R. Padgett
*Assistant Examiner*—T. S. Gron
*Attorney, Agent, or Firm*—Geoffrey H. Krauss; Joseph T. Cohen; Marvin Snyder

[57] ABSTRACT

Dichroic liquid crystal compositions for use in displays are mixtures of a liquid crystal host material and at least one of a plurality of dyes each having a plurality of azo (—N═N—) bonding groups and a high order parameter. The dichroic liquid crystal compositions each provide a contrast ratio on the order of 10:1.

2 Claims, No Drawings

DICHROIC LIQUID CRYSTAL COMPOSITIONS

BACKGROUND OF THE INVENTION

The present application is a continuation-in-part of U.S. patent application Ser. No. 721,668, filed Sept. 9, 1976, now abandoned.

The present invention relates to dichroic liquid crystal mixtures and particularly to novel mixtures of a liquid crystal host material and at least one of a plurality of dichroic dyes with each dye having a molecule with a plurality of azo bonding groups and with the liquid crystal mixture providing contrast ratios on the order of 10:1.

A display, particularly one of the liquid crystal type, can be characterized by brightness and contrast performance criteria. It is known to improve these performance criteria by dissolving a guest dichroic dye in a host liquid crystal material. Many dyes have been especially developed for a variety of applications such as dyeing of fabrics, printing of textiles, coloring of plastics, color image formation in photography, etc. To provide the requisite properties, such as hue, solubility, affinity for the substrate, chemical resistance, and compatibility with the medium from which the dye is applied, the molecular structure of the dye is specially designed for each application. Important dye properties required for the present application in liquid crystal displays, include the following: dichroism, solubility and high order parameter.

Dichroism is the property whereby an oriented assembly of dye molecules exhibit relatively low absorption of a given wavelength of light in one state of orientation and a relatively high absorption of the same wavelength in another state of orientation with respect to the light source. The orientation can be brought about by dissolution of the dye in a liquid crystal solvent or by embedding the dye in a stretched plastic.

Solubility must be sufficiently high so that thin layers, for example, of ten micrometers, have adequate light absorption in one of the oriented states. Ionic dyes will generally be inadequate not only because of their low solubility but also because they increase the electrical conductivity of liquid crystals.

Order parameter is a quantitative measure of the degree of molecular order or alignment in a given system. High order parameter is promoted by dyes with elongated shape having a large ratio of molecular length to breadth, similar to the shape of the molecules of liquid crystal host material. To insure an elongated shape, the molecules should have a rigid structure which can be obtained, for example, by linking benzene or heterocyclic rings with double bonded groups. The brightness and contrast are both related to the order parameter S of the dye, where $S = (R-1)/(R+2)$ and R is the ratio of light absorption in the dye measured with a polarizer respectively parallel and perpendicular to the nematic director of the liquid crystal host at the wavelength of maximum absorption. Advantageously, the order parameter should be at least 0.65, and preferably as high as possible, to achieve a minimum desired contrast ratio on the order of 10:1, while still allowing a liquid crystal guest-host display to be fabricated with a reasonable brightness parameter.

BRIEF SUMMARY OF THE INVENTION

In accordance with the invention, a dichroic liquid crystal composition comprises a host liquid crystal material in which is dissolved at least one of a plurality of guest dichroic dyes, each dichroic dye having an order parameter S of at least 0.65 and comprising a relatively elongated and rigid molecule having a plurality of azo bonding groups linking cyclic substituents and having chromophoric end groups (auxochromes), e.g., electron-withdrawing groups or electron-repelling groups imparting a characteristic color thereto by absorption over a specific portion of the visible light spectrum.

A first preferred dichroic liquid crystal composition has a bis-azo guest dichroic dye 4-(4-amino-2,5-dimethylphenylazo)-4'-dimethylaminoazobenzene dissolved in the liquid crystal host material; the mixture has an order parameter of about 0.69 and a maximum absorption wavelength of about 495 nanometers (nm.), and the dichroic dye imparts an orange-red color to the composition when acting upon white light.

Other preferred dichroic liquid crystal compositions use one of a group of tris-azo dichroic dyes, including: 4,4'-bis(4-dimethylaminophenylazo)-2,5-dimethylazobenzene (with an order parameter of about 0.7 and a maximum absorption wavelength of about 510 nm.); 4(2-hydroxynaphtylazo)-4'-(4-dimethylaminophenylazo)-2,5-dimethylazobenzene (with an order parameter of about 0.7 and a maximum absorption wavelength of about 555 nm.); 4,4'-bis(4-piperidinophenylazo)azobenzene (with an order parameter of about 0.74 and a maximum absorption wavelength of about 505 nm.); 4,4'-bis(4-dimethylaminophenylazo)azobenzene (with an order parameter of about 0.72 and a maximum absorption wavelength of about 510 nm.); 4,4'-bis(2-hydroxynaphthylazo)-azobenzene (with an order parameter of about 0.7 and a maximum absorption wavelength of about 575 nm.); 4,4'-bis-(4-N,N-dimethylamino-2,6-dimethylphenylazo)azobenzene (with an order parameter of about 0.78 and a maximum absorption wavelength of about 550 nm.); 4,4'-bis-(4-N,N-dimethylamino-2-methylphenylazo)azobenzene (with an order parameter of about 0.78 and a maximum absorption wavelength of about 555 nm.); and 4,4'-bis-(4-N,N-diethylamino-2-methylphenylazo)azobenzene (with an order parameter of about 0.78 and a maximum absorption wavelength of about 570 nm.).

Other preferred dichroic liquid crystal compositions use one of a group of penta-azo dichroic dyes: 4,4'-bis{2,5-dimethyl-4-[4-(N,N-dimethylaminophenylazo)]-phenylazo}azobenzene (with an order parameter of about 0.73 and a maximum absorption wavelength of about 525 nm.); 4,4'-bis{2,5-dimethyl-4-(2-hydroxynaphthylazo)phenylazo}azobenzene, (with an order parameter of about 0.70 and a maximum absorption wavelength of about 545 nm.); 4,4'-bis-{2,5-dimethyl-4-(2,2-methylethyl-2,3-dihydroperimidin-6-ylazo)-phenylazo}azobenzene (with an order parameter greater than 0.65 and a maximum absorption wavelength over the range from about 590 nm. to about 620 nm.); 4,4'-bis-{2,5-dimethyl-4-(4-ethylaminonaphthylazo)-phenylazo}azobenzene (with an order parameter of about 0.80 and a maximum absorption wavelength of about 595 nm.); and 4,4'-bis-{2,5-dimethyl-4-(4-methylaminonaphthylazo)phenylazo}azobenzene (with an order parameter of about 0.80 and a maximum absorption wavelength of about 595 nm.).

Accordingly, it is an object of the present invention to provide novel dichroic liquid crystal compositions having at least one dichroic dye having a plurality of azo bonding groups and having an order parameter in excess of 0.65.

This and other objects of the invention will become apparent from a consideration of the following detailed description.

DETAILED DESCRIPTION OF THE INVENTION

Liquid crystal displays of the host liquid crystal-guest dichroic dye type require a dichroic liquid crystal mixture having as high a value of order parameter S as possible, to obtain high contrast ratios. Towards this end, we have synthesized a plurality of dichroic liquid crystal mixtures each comprising a liquid crystal material, preferably of the positive dielectric anisotropy type, having dissolved therein at least one of a plurality of dichroic dyes each having a plurality of azo (—N=N—) bonding groups and characterized by an order parameter S greater than 0.65 and by a maximum absorption wavelength in the range from about 495 nm. to about 620 nm., whereby a dichroic dye guest-liquid crystal host display cell generally having colors in the red-violet portion of the visible spectrum may be provided with contrast ratios (i.e., the ratio of the light observable in the brighter condition to the light observable in the darker condition) on the order of 10:1.

The high order parameter values for the novel dichroic liquid crystal compositions set forth hereinbelow are measured by dissolving approximately 0.5% by weight of one of the preferred dichroic dyes disclosed herein below in a host nematic liquid crystal. One host is a mixture formed of 70% by weight of p-pentylphenyl-2-chloro-4-(p-pentylbenzoyloxy)benzoate (available from Eastman Organic Chemicals as their compound EK-11650) and 30% by weight of a mixture of esters available from E. M. Merc and Co. as their compound ZLI-389, and apparently composed of approximately 50–60% by weight of 4'-n-pentylphenyl ester of anisic acid, 25–35% by weight of 4'-n-pentylphenyl ester of 4-hexyloxybenzoic acid, and 10–15% by weight of (2'-cyano-4'butylphenyl) ester of 4-(hexanoyloxybenzoyloxy)-benzoic acid. The nematic mixture of this formulation possesses a large mesophase range with the nematic-to-isotropic transition temperature occurring at about 100° C. Another host is a mixture of biphenyl liquid crystals marketed by BDH, Ltd. under trade names E-7 and E-8. A test cell was constructed utilizing indium-oxide-coated glass substrates having surfaces coated with obliquely evaporated silicon oxide orientation layers, utilizing an incidence angle of 60° with respect to the substrate surface normal. The orientation layers provide unidirectional alignment of the molecules of the liquid crystal material and, generally, of the dichroic dye, parallel to the substrate planes. A 25 micron thick layer of the liquid crystal host-guest dye mixture is sealed between the substrates and order parameter is calculated from the measurement of light absorption with a polarizer respectively parallel and perpendicular to the nematic director of the liquid crystal material.

We have found that a first preferred dichroic liquid crystal mixture utilizes the bis-azo dye 4-(4-amino-2,5-dimethylphenylazo)-4'-dimethylamino azobenzene, having a chemical formula

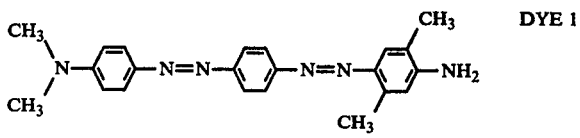

dissolved in the aforementioned host nematic liquid crystal composition. The first dye is synthesized by diazotizing 0.20 M. (4.8 grams) of N,N-dimethyl-4,4'-azodianiline in a mixture of 6 milliliters of hydrochloric acid and 30 milliliters of water. The temperature of the resulting mixture is maintained at a temperature of 0° C. while 1.5 grams of sodium nitrite is added. After approximately one hour, the resulting clear diazonium salt is coupled with about 2.4 grams of 2,5-dimethylaniline at a reaction temperature of between 0° C. and 5° C. The coupling reaction product is then poured into water, neutralized with potassium carbonate and a precipitated product collected on filter paper. The order parameter of the dichroic liquid crystal mixture using the aforementioned bis-azo dichroic dye compound was found to be on the order 0.69, while the maximum absorption wavelength is found to be approximately 495 nm., whereby the dye imparts a generally red-orange color to the liquid crystal compound in a display.

A group of preferred dichroic liquid crystal compounds utilize other guest dichroic dyes, having three azo groups. These dyes are synthesized as follows:

The bis-azo dye hereinabove described is diazotized and then coupled, as described above, with either N,N-dimethylaniline or β-naphthol to yield a pair of tris-azo dyes.

The first tris-azo dye is 4,4'-bis(4-dimethylaminophenylazo)-2,5-dimethylazobenzene, having a chemical formula

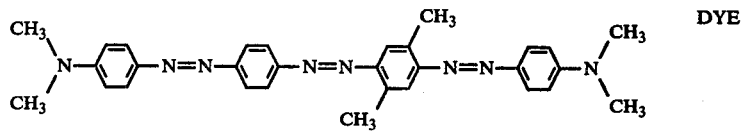

The liquid crystal composition utilizing this tris-azo dye has an order parameter S=0.7 and a maximum absorption wavelength of about 510 nm., whereby a red color is imparted to the guest-host liquid crystal material in a display.

A second preferred tris-azo dye for use in a dichroic liquid crystal composition is produced by coupling with β-naphthol and is 4-(2-hydroxynaphthylazo)-4'-(4-dimethylaminophenylazo)-2,5-dimethylazobenzene having a chemical formula

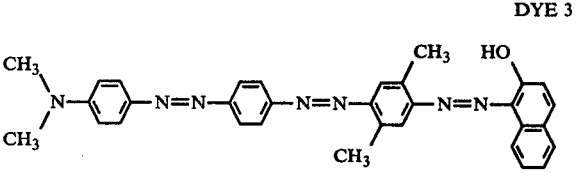

with the dichroic liquid crystal composition utilizing this dye having an order parameter S of about 0.7 and a maximum absorption wavelength of about 555 nm., whereby a liquid crystal display having a violet color may be fabricated.

Six additional tris-azo dyes for additional dichroic liquid crystal compositions are synthesized by tetrazotizing 0.015 M (3.2 grams) of azodianiline in a mixture of 9 milliliters of hydrochloric acid and 45 milliliters of water. The mixture is cooled to 0° C. and 2.25 grams of sodium nitrite in 10 milliliters of water is added. The resulting clear tetrazonium solution is coupled with two equivalents of a selected one of: N-phenylpiperidine; N,N-dimethylaniline; β-naphthol; N,N,3,5-tetramethylaniline; N,N-dimethylaminotoluidine; and N,N-diethylaminotoluidine. The coupling reactions are carried out by dissolving the chosen one of the six couplers in acetic acid and cooling the solution to 5° C. prior to adding the tetrazotized azodianiline. The reaction products are then poured into ice water, neutralized and the precipitate is collected.

The tris-azo dye synthesized using the N-phenyl-piperidine coupler is 4,4'-bis(4-piperidino-phenylazo)azobenzene, having the chemical formula

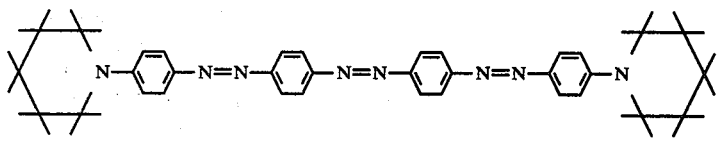

having an order parameter of about 0.74 and a maximum absorption wavelength of about 505 nm., whereby a display having a red color may be fabricated.

The tris-azo dye synthesized by coupling with N-N-dimethyl-aniline is 4,4'-bis(4-dimethylamino-phenylazo)azobenzene having a chemical formula

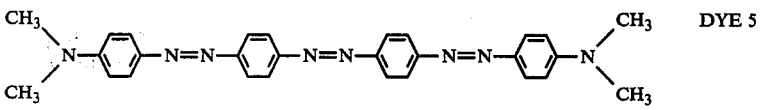

having an order parameter on the order of 0.72 and a maximum absorption wavelength of about 510 nm., whereby a display having a red color may be fabricated.

The tris-azo dye synthesized by coupling with β-naphthol is 4,4'-(bis-2-hydroxynaphthylazo)azobenzene, having a chemical formula

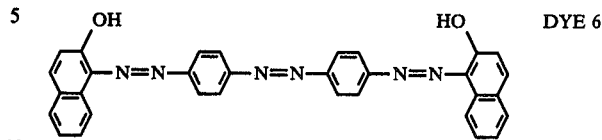

having an order parameter on the order of 0.7 and a maximum absorption wavelength of about 575 nm., whereby a display having a purple color may be fabricated.

The tris-azo dye synthesized by coupling with N,N,3,5-tetramethylaniline is 4,4'-bis-(4-N,N-dimethylamino-2,6-dimethylphenylazo)azobenzene, having a chemical formula

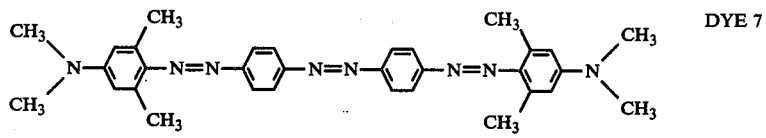

having an order parameter of about 0.78 and a maximum absorption wavelength of about 550 nm., whereby a display having a violet color may be fabricated.

The tris-azo dye synthesized by coupling with N,N-dimethyl-aminotoluidine is 4,4'-bis-(4-N,N-dimethylamino-2-methylphenyl-azo)azobenzene, having a chemical formula

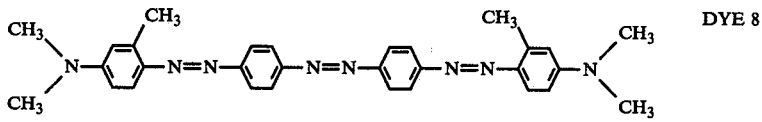

having an order parameter of about 0.78 and a maximum absorption wavelength of about 555 nm., whereby a display having a violet color may be fabricated.

The last tris-azo dye is synthesized by coupling with N,N-diethylaminotoluidine and is 4,4'-bis-(4-N,N-diethylamino-2-methylphenylazo)azobenzene, having a chemical formula

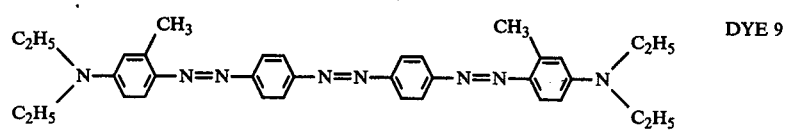

having an order parameter of about 0.78 and a maximum absorption wavelength of about 570 nm., whereby a display having a purple color may be fabricated.

We have also found a group of dichroic liquid crystal compositions in which are dissolved one of a group of high order parameter dichroic dyes each having five azo bonding groups (penta-azo dyes). Each penta-azo dye is synthesized by tetrazotizing azodianiline, as described in the synthesis of dyes 4-9 hereinabove, and then coupling the tetrazotized azodianiline with two equivalents of 2,5-dimethylaniline. The coupling products are poured into ice water, neutralized and the precipitate collected. The precipitated product is tetrazotized, as above, for a second time and is then coupled with two equivalents of one of: N,N-dimethylaniline; β-naphthol; 2,2-methylethyl-2,3-dihydroperimidine; N-ethylaminonaphthalene or N-methylaminonaphthalene.

A first dichroic liquid crystal composition of this group, utilizes a first penta-azo dye prepared by coupling with N,N-dimethylaniline, is 4,4'-bis-[2,5-dimethyl-4-{4-(N,N-dimethylaminophenylazo)}•phenylazo]azobenzene, having a chemical formula

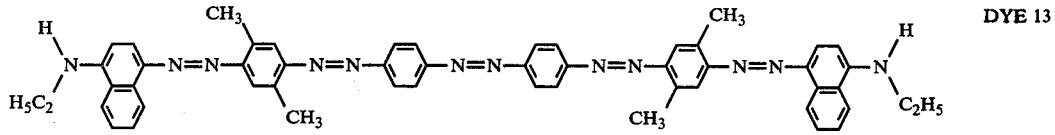

having an order parameter of about 0.73 and a maximum absorption wavelength of about 525 nm., whereby a display having a deep red color may be fabricated.

The second penta-azo dye, synthesized by coupling with β-naphthol, is 4,4'-bis{2,5-dimethyl-4-(2-hydroxynaphthylazo)-phenylazo}azobenzene, having a chemical formula

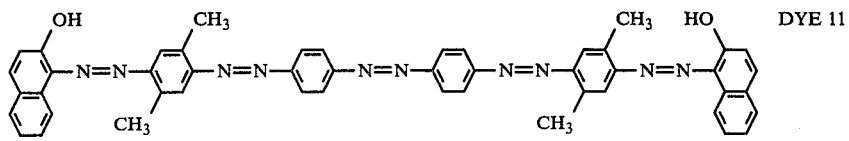

having an order parameter of about 0.70 and a maximum absorption wavelength of about 545 nm., whereby a display having a red-violet color may be fabricated.

A third penta-azo dye, synthesized by coupling with 2,2-methylethyl-2,3-dihydroperimidine, is 4,4'-bis-{2,5-dimethyl-4-(2,2-methylethyl-2,3-dihydroperimidin-6-ylazo) phenylazo}azobenzene, having a chemical formula

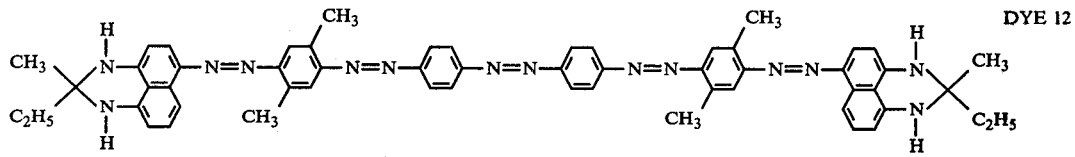

having an order parameter greater than the 0.65 and a somewhat broad spectrum maximum absorption wavelength over the range from about 590 nm. to about 620 nm., whereby a display having a blue-black color may be fabricated.

The penta-azo dye synthesized by coupling with N-ethylaminonaphthalene, is 4,4'-bis-2,5-dimethyl-4-(4-ethylaminonaphthylazo)-phenylazo azobenzene, having a chemical formula

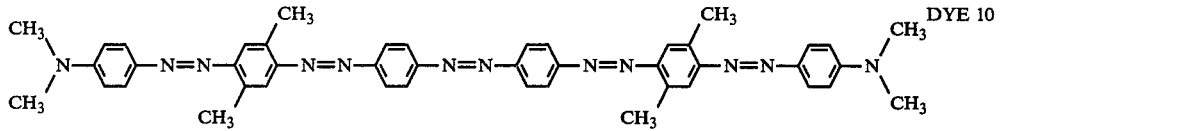

having an order parameter of about 0.80 and a maximum absorption wavelength of about 595 nm., whereby a display having a blue color may be fabricated.

The last penta-azo dye is prepared by coupling with N-methylaminonaphthalene and is 4,4'-bis-{2,5-dimethyl-4-(4-methylaminonaphthylazo)-phenylazo}azobenzene, having a chemical formula

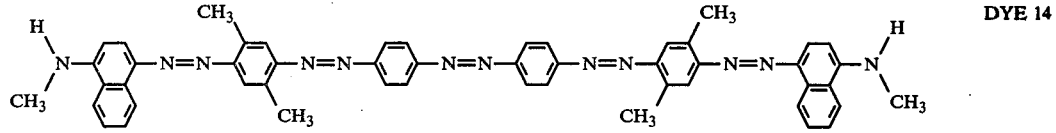

having an order parameter of about 0.8 and a maximum absorption wavelength of about 595 nm., whereby a display having a blue color may be fabricated.

As already mentioned hereinabove, the dichroic liquid crystal compositions comprise a dichroic dye dissolved in a liquid crystal host. Depending on the electro-optic effect to be utilized, the host can be a nematic or cholesteric liquid crystal. Suitable nematic liquid crystals are the biphenyl liquid crystals such as E-7 and E-8 from BDH, Ltd., Schiff base materials such as mixtures of MBBA and p-ethoxybenzylidene-p-aminobenzonitrile, esters available from Merck Company and Hoffman LaRoche Company, and phenylcyclohexanes and azoxy mixtures available from Merck Company. Suitable cholesteric liquid crystals can be made by incorporating optically active compounds in any of the above nematic liquid crystals.

For example, a dichroic liquid crystal composition was prepared by dissolving 0.5% of Dye #9 in a host comprised of a mixture of 10% of optically active chiral dopant CB-15 and 90% biphenyl type liquid crystal E-8 (both obtained from BDH Ltd.) A conventional liquid crystal cell was filled with the above dichroic liquid crystal composition. The boundary condition inside the cell was homeotropic and the spacing between the cell substrates was about 0.5 mil. The resulting device had a threshold of 15 V, and in the unenergized state the color was purple. Upon applying a voltage in excess of 15 V, the display became substantially colorless. The contrast ratio measured at 570 nm. was in excess of 12:1. The transmission at 570 nm. in the presence of voltage was about 40%. Similar results were obtained with Dye #13 and Dye #14. These last two dyes gave blue displays in the unenergized state.

In a second example, a dichroic liquid crystal composition was prepared by dissolving 0.5% of Dye #3 in a host comprised of 5% cholesteryl nonanoate and 95% of a mixture of esters described and claimed in U.S. Pat. No. 3,984,344. This composition was introduced into a cell having homeotropic boundaries and a cell gap of 0.5 mil. The threshold was about 4.5 V. A diffuse reflector was attached to the rear substrate of the cell to provide a reflective display. In the unenergized state, the color of the display was violet. When energized, the display turned substantially colorless and had a contrast ratio in excess of 10:1 as measured at a wavelength of about 550 nm. The brightness in the activated state was about twice that of a conventional reflective twist cell.

In a third example, a dichroic liquid crystal composition was prepared by dissolving 0.5% of Dye #12 in a host comprised of E-7. A 90° twist cell was fabricated by conventional techniques except that only a single polarizer was used. In the unenergized stated, the color of the display was purple. The energized state exhibited a contrast ratio in excess of 20:1 and the brighness was excellent. The viewing angle was about 180° which represents a significant improvement over conventional twist cells with two polarizers.

There has just been described a group of fourteen different dichroic liquid crystal compositions each having a dichroic dye, structured with multiple-azo bonding groups, dissolved therein to achieve an order parameter S greater than 0.65 to provide a contrast ratio on the order of 10:1 when the dichroic liquid crystal composition is used in a liquid crystal display.

While the present invention has been described with reference to several preferred embodiments thereof, many variations and modifications will now become apparent to those skilled in the art. In particular, other liquid crystal materials such as the esters claimed in U.S. Pat. No. 3,984,344, issued Oct. 5, 1976, the biphenyl materials available from BDH Chemicals (for which several of the order parameter measurements were made, i.e. dyes #7, 8, 9, 12, 13 14), the phenylcyclohexane materials (several of which are commercially available from Merck Co.) and the like - may be equally advantageously utilized with the dyes hereinabove described to achieve similar magnitudes of order parameter S. It is our intent, therefore, to be limited not by the scope of the present disclosure herein, but only by the scope of the appended claims.

What is claimed is:

1. A dichroic liquid crystal composition for use in a liquid crystal display, comprising:
   a host nematic liquid crystal material; and
   a guest tris-azo dichroic dye dissolved in said nematic liquid crystal material, said dichroic dye having a general chemical formula

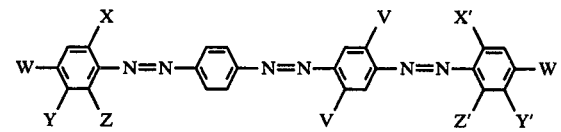

wherein the substituents of bonds V, W, X, Y, Z, X', Y', and Z' are coordinately selected from table I

TABLE I

| DYE | V | W | X |
|---|---|---|---|
| A | —CH$_3$ | —N(CH$_3$)$_2$ | —H |
| B | —CH$_3$ | —N(CH$_3$)$_2$ | —H |
| C | —H | | —H |
| D | —H | —N(CH$_3$)$_2$ | —H |
| E | —H | —H | —OH |
| F | —H | (CH$_3$)$_2$N— | —CH$_3$ |
| G | —H | (CH$_3$)$_2$N— | —CH$_3$ |
| H | —H | (C$_2$H$_5$)$_2$N— | —CH$_3$ |

| DYE | Y | Z | Y' | Z' | X' |
|---|---|---|---|---|---|
| A | —H | —H | —H | —H | —H |
| B | —H | —H | H H H H<br>\| \| \| \|<br>—C=C—C=C— | | —OH |
| C | —H | —H | —H | —H | —H |
| D | —H | —H | —H | —H | —H |
| E | H H H H<br>\| \| \| \|<br>—C=C=C=C | | H H H H<br>\| \| \| \|<br>—C=C—C=C— | | —OH |
| F | —H | —CH$_3$ | —H | —CH$_3$ | —CH$_3$ |
| G | —H | —H | —H | —H | —CH$_3$ |
| H | —H | —H | —H | —H | —CH$_3$ | for a desired set of an approximate order parameter (S) and an approximate wavelength ($\lambda_{Max.}$) of maximum absorption in accordance with Table II,

TABLE II

| DYE | S (approx.) | $\gamma$ Max.$^{(nm)}$ (approx.) |
|---|---|---|
| A | 0.7 | 510 |
| B | 0.7 | 555 |
| C | 0.74 | 505 |
| D | 0.72 | 510 |
| E | 0.7 | 575 |
| F | 0.78 | 550 |
| G | 0.78 | 555 |
| H | 0.78 | 570 | the approximate order parameter and approximate absorption wavelength being measured with said dye dissolved in the host material, said host nematic liquid crystal material consisting of a mixture of 70% by weight of p-pentylphenyl-2-chloro-4-(p-pentyl-benzoyloxy)benzoate, and 30% by weight of an ester mixture composed approximately of 50–60% by weight of 4'-n-pentylphenyl ester of anisic acid, 25–35% by weight of 4'-n-pentylphenyl ester of 4-hexyloxybenzoic acid, and 10–15% by weight of (2'-cyano-4'-butylphenyl) ester of 4-(hexanoyloxybenzoyloxy)-benzoic acid.

2. A dichroic liquid crystal composition as set forth in claim 1, wherein about 0.5% by weight of said dichroic dye is dissolved in said liquid crystal material.

* * * * *